(12) United States Patent
Pokhrel

(10) Patent No.: US 11,645,762 B2
(45) Date of Patent: May 9, 2023

(54) OBSTACLE DETECTION

(71) Applicant: Nokia Solutions and Networks Oy, Espoo (FI)

(72) Inventor: Niroj Pokhrel, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 85 days.

(21) Appl. No.: 17/281,815

(22) PCT Filed: Oct. 15, 2018

(86) PCT No.: PCT/FI2018/050741
§ 371 (c)(1),
(2) Date: Mar. 31, 2021

(87) PCT Pub. No.: WO2020/079309
PCT Pub. Date: Apr. 23, 2020

(65) Prior Publication Data
US 2021/0383092 A1    Dec. 9, 2021

(51) Int. Cl.
*G06V 20/13* (2022.01)
*G06T 7/215* (2017.01)
*G05D 1/10* (2006.01)

(52) U.S. Cl.
CPC .......... *G06V 20/13* (2022.01); *G05D 1/106* (2019.05); *G06T 7/215* (2017.01); *G06T 2207/10032* (2013.01); *G06T 2207/20084* (2013.01)

(58) Field of Classification Search
CPC ........ G06V 20/13; G06V 20/17; G05D 1/106; G05D 1/102; G06T 7/215; G06T 2207/10032; G06T 2207/20084
See application file for complete search history.

(56) References Cited

U.S. PATENT DOCUMENTS

| | | |
|---|---|---|
| 8,599,365 B2 | 12/2013 | Ma |
| 10,137,984 B1 * | 11/2018 | Flick .................... G08G 5/0056 |
| 10,249,200 B1 | 4/2019 | Grenier et al. |
| 10,679,509 B1 * | 6/2020 | Yarlagadda ............ G06N 20/20 |
| 10,683,006 B2 | 6/2020 | Huang et al. |
| 10,953,876 B2 | 3/2021 | Gotou et al. |
| 11,404,056 B1 * | 8/2022 | Meisenholder ......... G10L 15/22 |

(Continued)

OTHER PUBLICATIONS

Parappat et al., "Obstacle Avoidance by Unmanned Aerial Vehicles Using Image Recognition Techniques", Conference: 18th International Conference on Systems (part of CSCC '14, vol. 1: Latest Trends on Systems, Jul. 2014, pp. 378-381.

(Continued)

*Primary Examiner* — Ming Y Hon
(74) *Attorney, Agent, or Firm* — Alston & Bird LLP

(57) ABSTRACT

An apparatus, method and computer program is described comprising the following: receiving telemetry and/or motion vector data and distance data from a distance sensor of the drone or unmanned aerial vehicle (32); determining a segment of interest dependent on said telemetry data and/or motion vector data; processing said distance data to determine whether an obstacle falls within said segment of interest (34); receiving imaging data; and providing imaging data analysis in the event that an obstacle is determined to fall within said segment of interest (36).

20 Claims, 7 Drawing Sheets

(56) References Cited

U.S. PATENT DOCUMENTS

| | | | |
|---|---|---|---|
| 2010/0121574 A1* | 5/2010 | Ariyur | G08G 5/0021 |
| | | | 701/301 |
| 2010/0305857 A1 | 12/2010 | Byrne et al. | |
| 2016/0282468 A1 | 9/2016 | Gruver et al. | |
| 2017/0076616 A1 | 3/2017 | Kanade et al. | |
| 2017/0200305 A1* | 7/2017 | Oddo | G06T 17/00 |
| 2017/0314930 A1* | 11/2017 | Monterroza | G06N 3/049 |
| 2018/0033124 A1* | 2/2018 | Thomasson | G06T 7/62 |
| 2018/0068187 A1* | 3/2018 | Schultz | H04N 21/47 |
| 2018/0157255 A1 | 6/2018 | Halverson et al. | |
| 2019/0070995 A1* | 3/2019 | Cantrell | B64F 1/222 |
| 2019/0130768 A1* | 5/2019 | Clark | G08G 5/0086 |
| 2019/0206266 A1* | 7/2019 | Taveira | G08G 5/0069 |
| 2019/0212751 A1* | 7/2019 | Zhou | G05D 1/0246 |
| 2020/0026720 A1* | 1/2020 | Liu | G05D 1/101 |
| 2020/0027230 A1* | 1/2020 | Zhao | G05D 1/0094 |
| 2020/0077028 A1* | 3/2020 | Charlaix | B64C 39/024 |
| 2020/0098130 A1* | 3/2020 | Porter | G06T 7/10 |
| 2020/0109954 A1* | 4/2020 | Li | G05D 1/0278 |
| 2021/0001889 A1 | 1/2021 | Furukawa | |
| 2021/0064869 A1* | 3/2021 | Arrabotu | G08G 5/02 |
| 2021/0272088 A1* | 9/2021 | Srivastava | G06K 9/6256 |

OTHER PUBLICATIONS

McGee et al., "Obstacle Detection for Small Autonomous Aircraft Using Sky Segmentation", Proceedings of the 2005 IEEE International Conference on Robotics and Automation, Apr. 18-22, 2005, 6 pages.

International Search Report and Written Opinion received for corresponding Patent Cooperation Treaty Application No. PCT/FI2018/050741, dated Apr. 10, 2019, 17 pages.

Nieuwenhuisen et al., "Multimodal Obstacle Detection and Collision Avoidance for Micro Aerial Vehicles", European Conference on Mobile Robots, Sep. 25-27, 2013, pp. 7-12.

Moon et al., "Obstacle Detecting System for Unmanned Ground Vehicle using Laser Scanner and Vision", International Conference on Control, Automation and Systems, Oct. 17-20, 2007, pp. 1758-1761.

Chakravarty et al., "CNN-based Single Image Obstacle Avoidance on a Quadrotor", IEEE International Conference on Robotics and Automation (ICRA), May 29-Jun. 3, 2017, pp. 6369-6374.

Sampedro et al., "A Fully-Autonomous Aerial Robotic Solutionfor the 2016 International Micro Air Vehicle Competition", International Conference on Unmanned Aircraft Systems (ICUAS), Jun. 13-16, 2017, pp. 989-998.

Scherer et al., "Flying Fast and Low Among Obstacles: Methodology and Experiments", The International Journal of Robotics Research, vol. 27, No. 5, May 2008, pp. 549-574.

Ramli et al., "Obstacle Detection Technique Using Multi Sensorintegration for Small Unmanned Aerial Vehicle", Indonesian Journal of Electrical Engineering and Computer Science, vol. 8, No. 2, Nov. 2017, pp. 441-449.

Al-Kaff et al., "Obstacle Detection and Avoidance System Based on Monocular Camera and Size Expansion Algorithmfor UAVs", Sensors, vol. 17, No. 5, May 2017, pp. 1-22.

Bareiss et al., "On-board Model-based Automatic Collision Avoidance: Application in Remotely-piloted Unmanned Aerial Vehicles", Autonomous Robots, vol. 41, Jan. 25, 2017, 16 pages.

"FlytCAS Obstacle Sensing & Collision Avoidance for Autonomous Drones (flytbase.com)", Flytbase, Retrieved on Mar. 22, 2021, Webpage available at: https://flytbase.com/collision-avoidance/#flytcas.

Pokhrel, "Drone Obstacle Avoidance and Navigation using Artificial Intelligence", Thesis, Apr. 20, 2018, 114 pages.

Bareiss et al., "Visual Quadrotor Swarm for IMAV 2013 Indoor Competition", International Micro Air Vehicle Conference and Flight Competition (IMAV2013), Sep. 17-20, 2013, pp. 1-9.

Ramasamy et al., "LIDAR Obstacle Warning and Avoidance System for Unmanned Aerial Vehicle Sense-and-Avoid", Aerospace Science and Technology, vol. 55, Aug. 2016, pp. 1-15.

Extended European Search Report received for corresponding European Patent Application No. 18937062.0, dated Apr. 29, 2022, 7 pages.

* cited by examiner

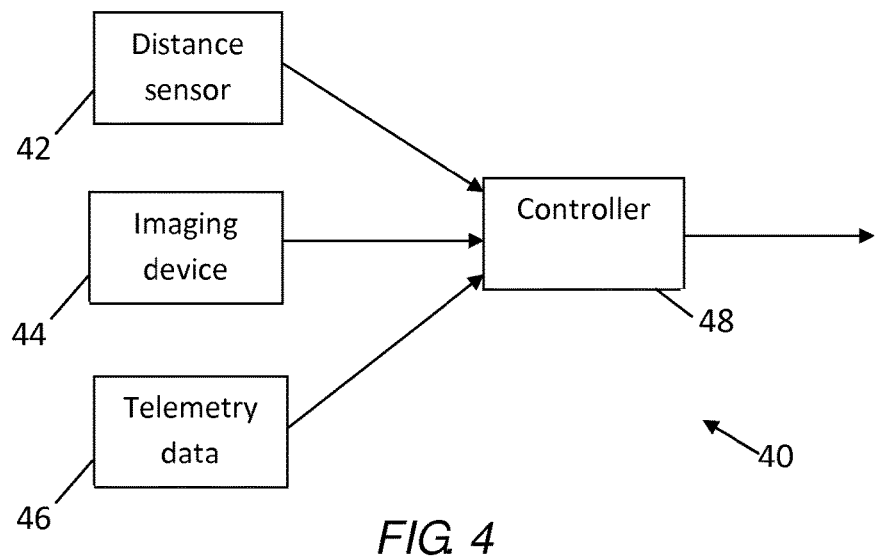
FIG. 4
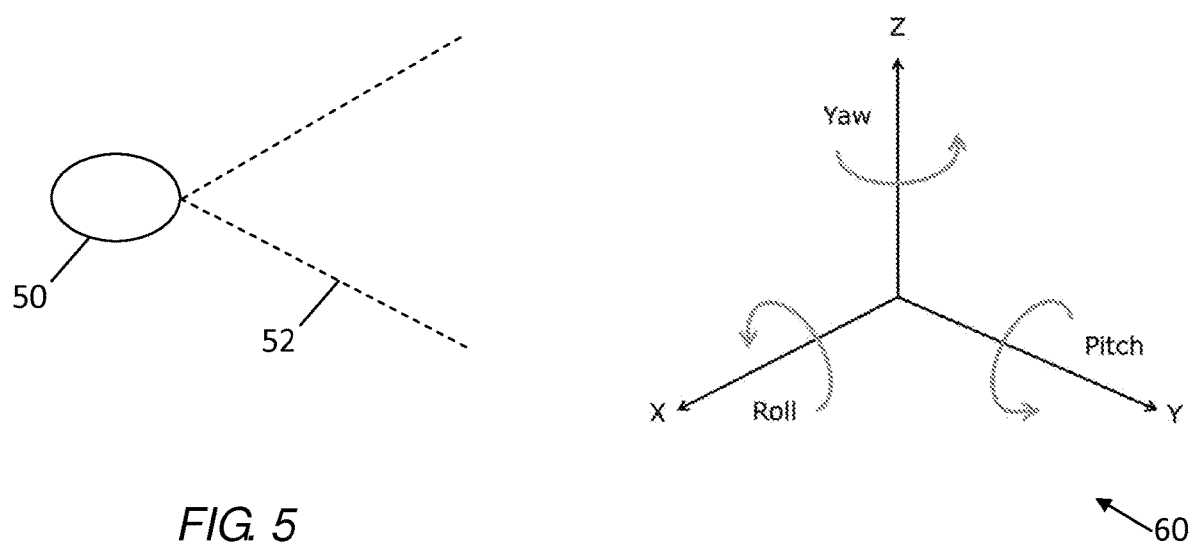
FIG. 5
FIG. 6

OBSTACLE DETECTION

CROSS-REFERENCE TO RELATED APPLICATIONS

This application is a national phase entry of International Application No. PCT/FI2018/050741, filed Oct. 15, 2018, the entire contents of which are incorporated herein by reference.

FIELD

This specification relates to obstacle detection and, more specifically, to obstacle detection in the control of drones or unmanned aerial vehicles (UAV).

BACKGROUND

A drone or unmanned aerial vehicle may operate in an environment including obstacles. There remains a need for alternative arrangements for detecting and reacting to such obstacles.

SUMMARY

In a first aspect, this specification provides an apparatus (e.g. for controlling a drone or unmanned aerial vehicle) comprising: means for receiving telemetry data and/or motion vector data for a drone or unmanned aerial vehicle; means for receiving distance data from a distance sensor of the drone or unmanned aerial vehicle; means for determining a segment of interest dependent on said telemetry data and/or motion vector data (such as projected contour dimensions over motion vector); means for processing said distance data to determine whether an obstacle falls within said segment of interest; means for receiving imaging data; and means for providing imaging data analysis in the event that an obstacle is determined to fall within said segment of interest. The distance measurement process may be continued in the event that an obstacle is not within said segment of interest (in such circumstances, imaging data and image data analysis may not be needed).

The means for providing imaging data analysis may comprise: means for segmenting said imaging data in the event that an obstacle is determined to fall within said segment of interest; and means for estimating dimensions of said obstacle from said segmented image data and said distance data. There may be provided means for determining one or more evasive paths, in the event that an obstacle is determined to fall within said segment of interest, wherein the one or more evasive paths are determined, at least in part, based on said estimated dimensions of said obstacle and said distance data. There may be provided means for verifying said dimensions of said obstacle using, at least in part, distance data outside said segment of interest. The contour dimensions of the drone or unmanned aerial vehicle may be projected around the motion vector from a field of view of the distance sensor. The contour dimensions may be used when determining the one or more evasive paths and may be used to further reduce the data to be analysed.

The means for segmenting said imaging data may comprise a neural network (such as a convolutional neural network).

In some embodiments, the imaging data is processed pixel-by-pixel.

In some embodiments, the distance sensor has a limited field of view.

The said distance sensor may comprise a LIDAR sensor.

In some embodiments, distance data outside said segment of interest are discarded. Alternatively, or in addition, in some embodiments, it may be possible to verify whether reconstruction of a 3D object from a 2D projection is correct or not by using earlier discarded distance data (e.g LIDAR data). Thus, the distance data which were not on the motion path of the drone may be used to verify the dimensionality correctness of the obstacles.

The telemetry data may be used to define a pitch of the drone or unmanned aerial vehicle.

The telemetry data may be obtained from at least one of a GPS unit, gyroscope, compass and barometer of the drone or unmanned aerial vehicle.

The motion vector data may define a direction of travel and/or a planned route of the drone or unmanned aerial vehicle.

In some embodiments, in the event that a path (or a planned path) of the drone or unmanned aerial vehicle changes, a field of view of distance sensor may be changed before the drone or unmanned aerial vehicle starts to move along a changed path. Furthermore, the contour dimensions of drone or unmanned aerial vehicle may project over a new planned motion vector from a field of view of distance sensor to change the segment to be analysed.

The means may comprise: at least one processor; and at least one memory including computer program code, the at least one memory and the computer program code configured, with the at least one processor, to cause the performance of the apparatus.

In a second aspect, this specification provides a method comprising: receiving telemetry data and/or motion vector data for a drone or unmanned aerial vehicle; receiving distance data from a distance sensor of the drone or unmanned aerial vehicle; determining a segment of interest dependent on said telemetry data and/or motion vector data; processing said distance data to determine whether an obstacle falls within said segment of interest; receiving imaging data; and providing imaging data analysis in the event that an obstacle is determined to fall within said segment of interest. The distance measurement process may be continued in the event that an obstacle is not determined to fall within said segment of interest. Providing imaging data analysis may comprise segmenting said imaging data in the event that an obstacle is determined to fall within said segment of interest and estimating dimensions of said obstacle from said segmented image data and said distance data.

Some embodiments include determining one or more evasive paths, in the event that an obstacle is determined to fall within said segment of interest, wherein the one or more evasive paths are determined, at least in part, based on said estimated dimensions of said obstacle and said distance data. Some embodiments may include verifying said dimensions of said obstacle using, at least in part, distance data outside said segment of interest.

The distance sensor (e.g. a LIDAR sensor) may have a limited field of view.

Distance data outside said segment of interest may be discarded.

The telemetry data may be used to define a pitch of the drone or unmanned aerial vehicle. The telemetry data may be obtained from at least one of a GPS unit, gyroscope, compass and barometer of the drone or unmanned aerial vehicle.

The motion vector data may define a direction of travel and/or a planned route of the drone or unmanned aerial vehicle.

In a third aspect, this specification describes any apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receive telemetry data and/or motion vector data for a drone or unmanned aerial vehicle; receive distance data from a distance sensor of the drone or unmanned aerial vehicle; determine a segment of interest dependent on said telemetry data and/or motion vector data; process said distance data to determine whether an obstacle falls within said segment of interest; receive imaging data; and provide imaging data analysis in the event that an obstacle is determined to fall within said segment of interest. The distance measurement process may be continued in the event that an obstacle is not determined to fall within said segment of interest. Providing imaging data analysis may include segmenting said imaging data in the event that an obstacle is determined to fall within said segment of interest and estimating dimensions of said obstacle from said segmented image data and said distance data.

In a sixth aspect, this specification describes a computer-readable medium (such as a non-transitory computer readable medium) comprising program instructions stored thereon for performing at least the following: receiving telemetry data and/or motion vector data for a drone or unmanned aerial vehicle; receiving distance data from a distance sensor of the drone or unmanned aerial vehicle; determining a segment of interest dependent on said telemetry data and/or motion vector data; processing said distance data to determine whether an obstacle falls within said segment of interest; receiving imaging data; and providing imaging data analysis in the event that an obstacle is determined to fall within said segment of interest. The distance measurement process may be continued in the event that an obstacle is not determined to fall within said segment of interest. Providing imaging data analysis may comprise segmenting said imaging data in the event that an obstacle is determined to fall within said segment of interest and estimating dimensions of said obstacle from said segmented image data and said distance data.

In a seventh aspect, this specification describes an apparatus comprising: at least one processor; and at least one memory including computer program code which, when executed by the at least one processor, causes the apparatus to: receive telemetry data and/or motion vector data for a drone or unmanned aerial vehicle; receive distance data from a distance sensor of the drone or unmanned aerial vehicle; determine a segment of interest dependent on said telemetry data and/or motion vector data; process said distance data to determine whether an obstacle falls within said segment of interest; receive imaging data; and provide imaging data analysis in the event that an obstacle is determined to fall within said segment of interest. The distance measurement process may be continued in the event that an obstacle is not determined to fall within said segment of interest. Providing imaging data analysis may include segmenting said imaging data in the event that an obstacle is determined to fall within said segment of interest and estimating dimensions of said obstacle from said segmented image data and said distance data.

In an eighth aspect, this specification describes an apparatus comprising: a first input for receiving telemetry data and/or motion vector data for a drone or unmanned aerial vehicle; a second input for receiving distance data from a distance sensor of the drone or unmanned aerial vehicle; a first control module for determining a segment of interest dependent on said telemetry data and/or motion vector data (such as projected contour dimensions over motion vector); an obstacle detection module for processing said distance data to determine whether an obstacle falls within said segment of interest; a fourth input for receiving imaging data; and a data analysis module for providing imaging data analysis in the event that an obstacle is determined to fall within said segment of interest. The distance measurement process may be continued in the event that an obstacle is not within said segment of interest. The data analysis module may segment said imaging data in the event that an obstacle is determined to fall within said segment of interest and estimate dimensions of said obstacle from said segmented image data and said distance data.

BRIEF DESCRIPTION OF THE DRAWINGS

Examples will now be described, by way of non-limiting examples, with reference to the following schematic drawings, in which:

FIG. 4 is a block diagram of a system in accordance with an example embodiment;

FIG. 5 is a block diagram of an example drone or unmanned aerial vehicle in accordance with an example embodiment;

FIG. 6 is a block diagram showing possible movements in accordance with an example embodiment;

DETAILED DESCRIPTION

Figure 1:
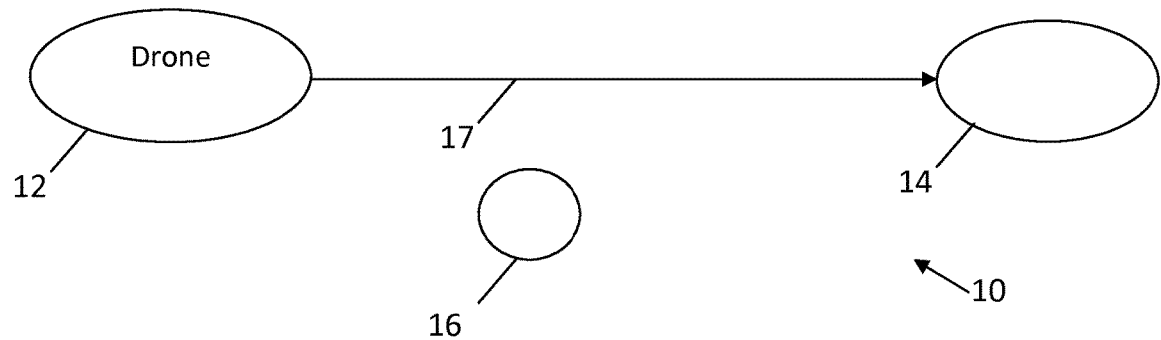
FIG. 1 is a block diagram of a system in accordance with an example embodiment.

In the description and drawings, like reference numerals refer to like elements throughout.

FIG. 1 is a block diagram of a system, indicated generally by the reference numeral 10, in accordance with an example embodiment. The system 10 comprises a drone or unmanned aerial vehicle (UAV) 12, an intended destination 14 and a potential obstacle 16. An intended path 17 from the drone or unmanned aerial vehicle 12 to the intended destination 14 is shown. As the potential obstacle does not impact the intended path, no evasive path is required in order for the drone or unmanned aerial vehicle to reach the destination 14.

Figure 2:
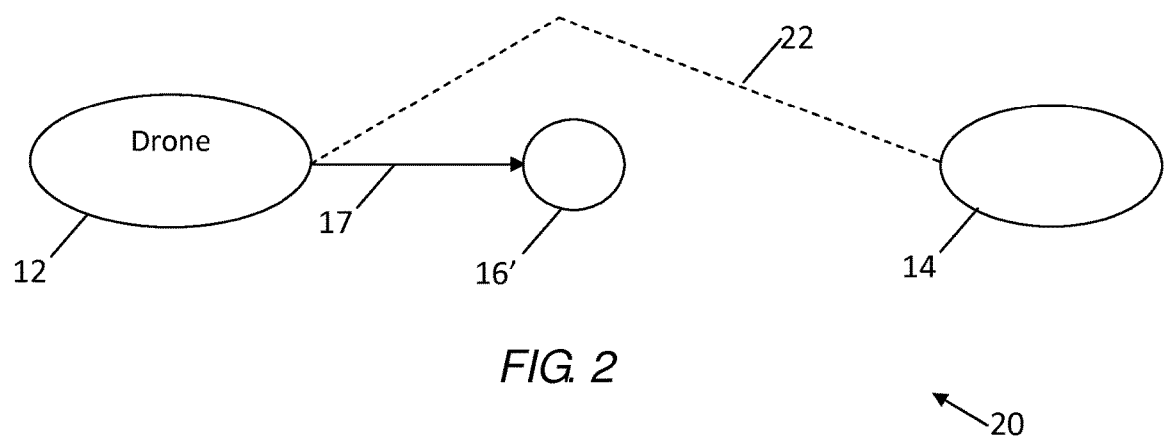
FIG. 2 is a block diagram of a system in accordance with an example embodiment.

FIG. 2 is a block diagram of a system, indicated generally by the reference numeral 20, in accordance with an example embodiment. The system 20 comprises the drone 12, the intended destination 14 for the drone, and an obstacle 16'. The obstacle 16' is on the intended path 17 from the drone 12 to the intended destination 14, such that an evasive path 22 is required for the drone 12 to reach the intended destination 14.

Figure 3:
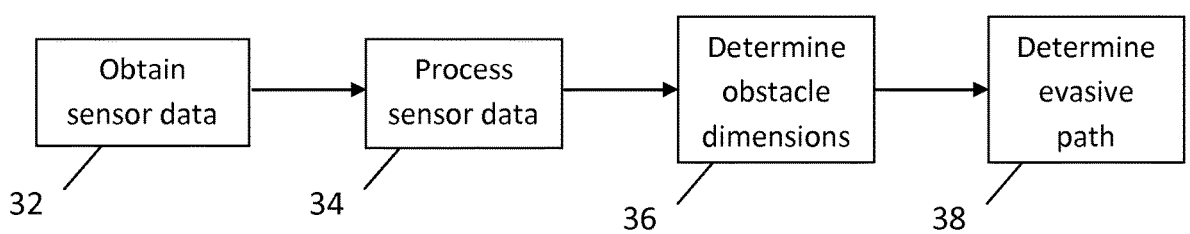
FIG. 3 is a flow chart showing an algorithm in accordance with an example embodiment.

FIG. 3 is a flow chart showing an algorithm, indicated generally by the reference numeral 30, in accordance with an example embodiment.

The algorithm 3o starts at operation 32 where sensor data is received at a control module. As described in detail below, the sensor data may include distance data received from a distance sensor of a drone or unmanned aerial vehicle (such as the drone 12 described above), image data captured by an imaging device, such as a high definition (HD) camera that forms part of the drone or unmanned aerial vehicle 12 and telemetry data including information such as the co-ordinates of the drone or unmanned aerial vehicle 12. The image data may comprise still images and/or video images.

At operation 34, the sensor data is processed. The processing may, amongst other operations, determine whether an obstacle is located on an intended path of the drone or unmanned aerial vehicle (such as the path 17 described above).

In the event that one or more obstacles are determined, imaging data analysis is provided. For example, as shown in the algorithm 30, the obstacle dimensions may be determined at operation 36 and an evasive path may be determined at operation 38. It should be noted that, as part of the operation 38, the size of the drone or unmanned aerial vehicle 12 may be considered. For example, the outer contours of the drone or unmanned aerial vehicle may be used to define a cuboid shape to be used in the evasive path determination. The use of such a cuboid shape may be computationally efficient.

FIG. 4 is a block diagram of a system, indicated generally by the reference numeral 40, in accordance with an example embodiment. The system comprises a distance sensor 42, an imaging device 44, a telemetry data input 46 and a controller 48. The controller 48 receives distance data from the distance sensor 42, imaging data from the imaging device 44 and telemetry data from the telemetry data input 46 (implementing operation 32 of the algorithm 30 described above). The controller 48 may receive further data from one or more other inputs (not shown), either instead of, or in addition, to at least some of the inputs shown in FIG. 4.

The controller 48 processes the sensor data (thereby implementing operation 34 of the algorithm 30). If an obstacle is detected during the processing of the data, obstacle dimensions are determined (thereby implementing operation 36 of the algorithm 30). The controller 48 may further determine one or more evasive paths, based, at least in part, on the estimated obstacle dimensions and the distance data (and optionally on the dimensions of the drone or unmanned aerial vehicle), thereby implementing operation 38 of the algorithm 30.

The distance sensor 42 may be a LIDAR sensor. In some implementations, the distance sensor 42 may be required to be small and light, and this may lead to the use of a sensor with limited functionality. For example, a LIDAR sensor with a limited field of view (such as a solid state LIDAR) may be used. The skilled person will be aware that other distance sensors may be used in example embodiments. Many of the unnecessary LIDAR segments are discarded as they are not in the path of the motion of the drone (the selection of the LIDAR segments is discussed further below). Interesting segments are those around the path of the motion of the drone, anything out of that may be discarded.

FIG. 5 is a block diagram of an example drone or unmanned aerial vehicle 50, in accordance with an example embodiment. The drone or unmanned aerial vehicle 50 includes a distance sensor having a field of view 52 (indicated by dotted lines in FIG. 5). Obstacles within the field of view 52 may be detected by the distance sensor of the drone 50, whereas obstacles outside the field of view 52 may not be detected. The limited field of view can present challenges in the identification of potential obstacles, as discussed further below.

A drone or unmanned aerial vehicle, such as the drones 12 and 50 described above, may be able to move in three-dimensions (i.e. in one or more of x-, y- and z-axes of movement). Moreover, a drone or unmanned aerial vehicle may be able to rotate along any of the x-, y- and z-axes of movement (referred to as roll, pitch and yaw respectively). FIG. 6 is a block diagram showing possible movements, indicated generally by the reference numeral 60, in accordance with an example embodiment. Understanding the movement of a drone or unmanned aerial vehicle may form part of the determination of an evasive paths (e.g. as part of the operation 38 described above). The processing of such movement presents challenges, particular where a controller (such as the controller 48) is implemented as part of the drone or unmanned aerial vehicle, since such controllers typically have resource constraints and performance constraints.

Figure 7:
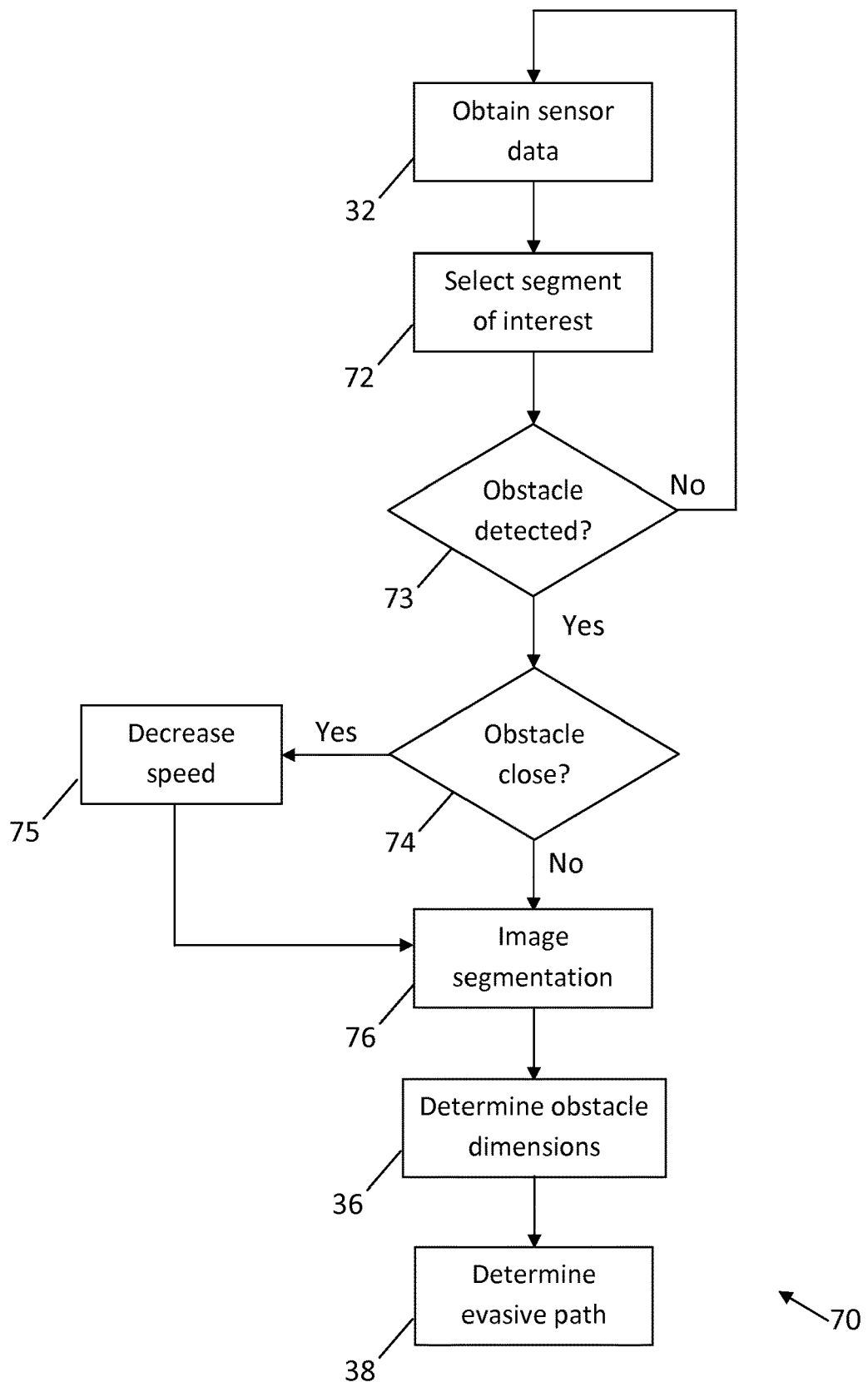
FIG. 7 is a flow chart showing an algorithm in accordance with an example embodiment.

FIG. 7 is a flow chart showing an algorithm, indicated generally by the reference numeral 70, in accordance with an example embodiment. As described in detail below, the algorithm 70 includes the operations 32, 36 and 38 of the algorithm 30 described above, and includes a plurality of operations 72 to 76 that collectively implement the operation 34 described above.

The algorithm 70 starts at operation 32 where sensor data is obtained. The data received in operation 32 may include at least some of:

Distance data from a distance sensor of a drone or an unmanned aerial vehicle. The distance sensor may be a LIDAR sensor (e.g. a solid data LIDAR sensor). The distance sensor may have a limited field of view, as discussed above.

Imaging data from an imaging device (e.g. still and/or video images). The imaging data may be HD data (obtained using an HD camera).

Telemetry data for the drone or unmanned aerial vehicle. The telemetry data may be used to define a pitch of the drone or unmanned aerial vehicle. For example, if the pitch changes, the segment of interest of the distance data (see the operation 72 discussed below) may change. The direction in which limited field of view of the distance sensor is facing may be changed to be in line with updated pitch to cover at least in part new space. The telemetry data may include location data (e.g. from GPS data) and the direction of the distance sensor based on pitch, yaw and roll data. The telemetry data may be obtained from one or more of a GPS unit, gyroscope, compass and barometer of the drone or unmanned aerial vehicle.

Motion vector data for the drone or unmanned aerial vehicle. The motion vector data may define a direction of travel and/or a planned route of the drone or unmanned aerial vehicle (which may be directly related to the segment of interest referred to in operation 72 below). The motion vector data may, for example, be calculated from the telemetry data and the intended destination, segment in the planned route or planned route of the drone or unmanned aerial vehicle.

At operation 72, a segment of interest of said distance data is selected. The segment of interest may be dependent on the telemetry data and/or the motion vector data discussed above. The motion of drones and unmanned aerial vehicles is relatively complicated. Such devices may be able to move and rotate in three dimensions and the pitch may be speed-dependent. At least some of the sensors may have limited fields of view and the drone or unmanned aerial vehicle may have limited processing power. As a result, it is not trivial to determine the presence and location of obstacles or an appropriate evasive path.

At operation 73, the distance data is processed to determine whether any obstacles fall within the segment of interest selected in operation 72. Distance data outside said segment of interest may, in some embodiments, be discarded (this may be acceptable since obstacles that are not on an intended or planned path of the drone or unmanned aerial vehicle may be ignored). The determination made in operation 73 can be carried out (repeatedly) on-the-fly. The operation 73 is relatively quick, given that the data is limited by using the segment of interest.

If an obstacle is detected in operation 73, the algorithm 70 moves to operation 74. Otherwise, the algorithm 70 returns to operation 71.

At operation 74, it is determined whether the drone or unmanned aerial vehicle is close to the obstacle detected in operation 73 (many definitions for "close", including distance-based and time-to-collision based definitions will be readily apparent to those skilled in the art). If the obstacle is not deemed to be close, then the algorithm 70 moves to operation 76. If the obstacle is deemed to be close, then the algorithm 70 moves to operation 75, where the speed of the drone or unmanned aerial vehicle is decreased before the algorithm moves to operation 76.

At operation 76, the imaging data (received in operation 32) is processed to generate a segmentation map, wherein said one or more evasive paths is determined, at least in part, based on said segmentation map (as discussed further below). In the example algorithm 70, the segmentation of operation 76 is carried out if an obstacle is detected in operation 73. Thus, the segmentation process (which may be relatively slow) is conducted when an obstacle is detected. The detection is very fast compared to avoidance, thus saving resources of UAV, and segmentation used when needed.

A neural network (such as a convolutional neural network) may be used for processing said imaging data to generate said segmentation map. Other computer vision techniques could be used to implement the operation 76.

Once the image segmentation is triggered, the number of images needed to be processed is based on the flight manoeuvre. If the drone is flying at a height lower than maximum allowed height then the drone can fly over obstacles. It will be the easiest solution and may only need a single image to be processed. If we want to avoid an obstacle by going around it, the number of image segmentation depends on the depth of the obstacles. The contour dimensions of UAV are projected around the motion vector from a field of view of the distance sensor to further reduce the data to be analysed.

The segmentation map may be based, at least in part, on the imaging data and the distance data. Image data segmentation is used intermittently and depending on analysis of the earlier operations to avoid intensive computation on-the-fly. However, in some cases the data needed in image data segmentation is transmitted to ground control station or cloud. The segmentation may be used for new route planning, for example.

The imaging data may be processed pixel-by-pixel when generating the segmentation map.

On the basis of the image segmentation generation in operation 76, obstacle dimensions are determined in operation 36. Further details of example obstacle dimension determining arrangements are discussed below.

Finally, at operation 38, one or more evasive paths are determined. The one or more evasive paths are determined, at least in part, based on said imaging data and said distance data.

The algorithm 70 is provided by way of example only. One or more of the operations of the algorithm 70 may be omitted and/or carried out in a different order. For example, in some embodiments, the operations 74 and 75 may be omitted.

Figure 8A:
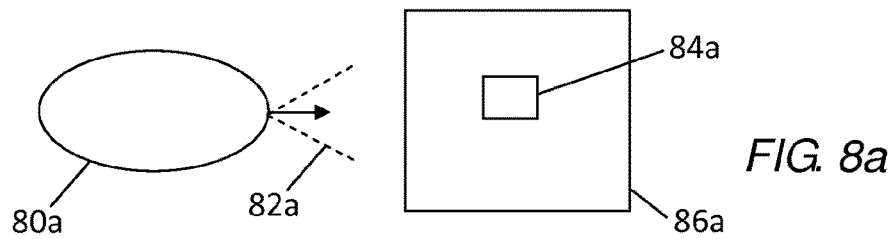
FIGS. 8a, 8b and 8c show example drones or unmanned aerial vehicles used in accordance with example embodiments.
Figure 8B:
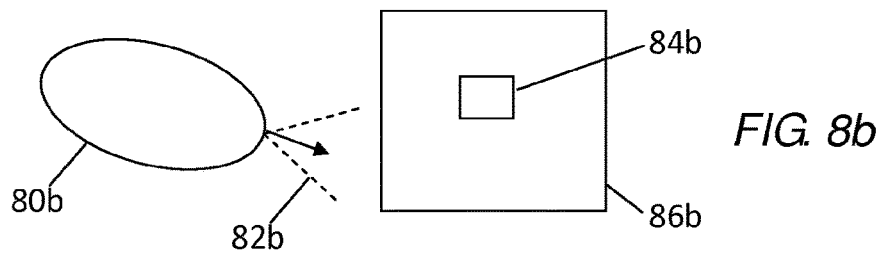
Figure 8C:
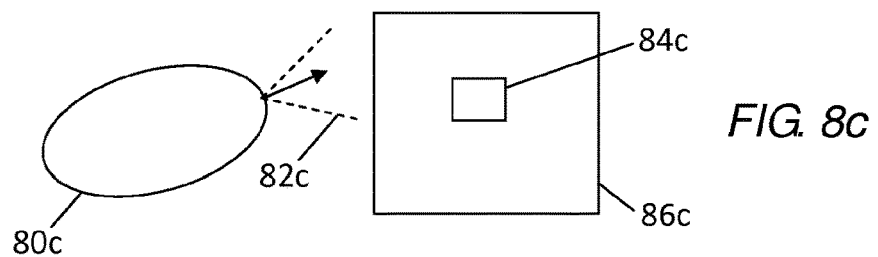

A particular complication with the movement of drones or unmanned aerial vehicles is that the pitch of such devices may be variable (e.g. speed-dependent). FIGS. 8a, 8b and 8c show example drones or unmanned aerial vehicles, indicated by the reference numerals 80a, 80b and 80c respectively, in accordance with example embodiments.

The drones or unmanned aerial vehicles 80a, 80b and 80c have different pitches. A change in pitch may affect the field of view of one or more of a distance sensor (such as the distance sensor 42), an imaging device (such as the imaging device 44) and other sensors that are used to obtain sensor data in the operation 32 described above.

By way of example, assume that the drone or unmanned aerial vehicle 80a shown in FIG. 8a is moving forward and has a horizontal pitch such that the field of view of a distance sensor of the drone or unmanned aerial vehicle 80a is directed forwards (as indicated by the indicative field of view 82a). Assume that the drone or unmanned aerial vehicle 80a is being used to detect an object 84a within an image 86a. The object 84a is detected by a distance sensor (such as the distance sensor 42 described above) and the image 86 is detected by an imaging device (such as the imaging device 44 described above).

The pitch of a drone or unmanned aerial vehicle may change (for example, dependent on the speed of the drone or unmanned aerial vehicle). For example, FIG. 8b shows a drone or unmanned aerial vehicle 80b having a pitch such that the field of view 82b is directed downwards. As can be seen in FIG. 8b, in order for the object 84b to be captured by the relevant sensors, the segment of interest should be adjusted such that the upper extent of the sensor signals is considered.

Conversely, FIG. 8c shows a drone or unmanned aerial vehicle 80c having a pitch such that the field of view 82c is directed upwards. As can be seen in FIG. 8c, in order for the object 84c to be captured by the relevant sensors, the segment of interest should be adjusted such that the lower extent of the sensor signals is considered.

Figure 9:
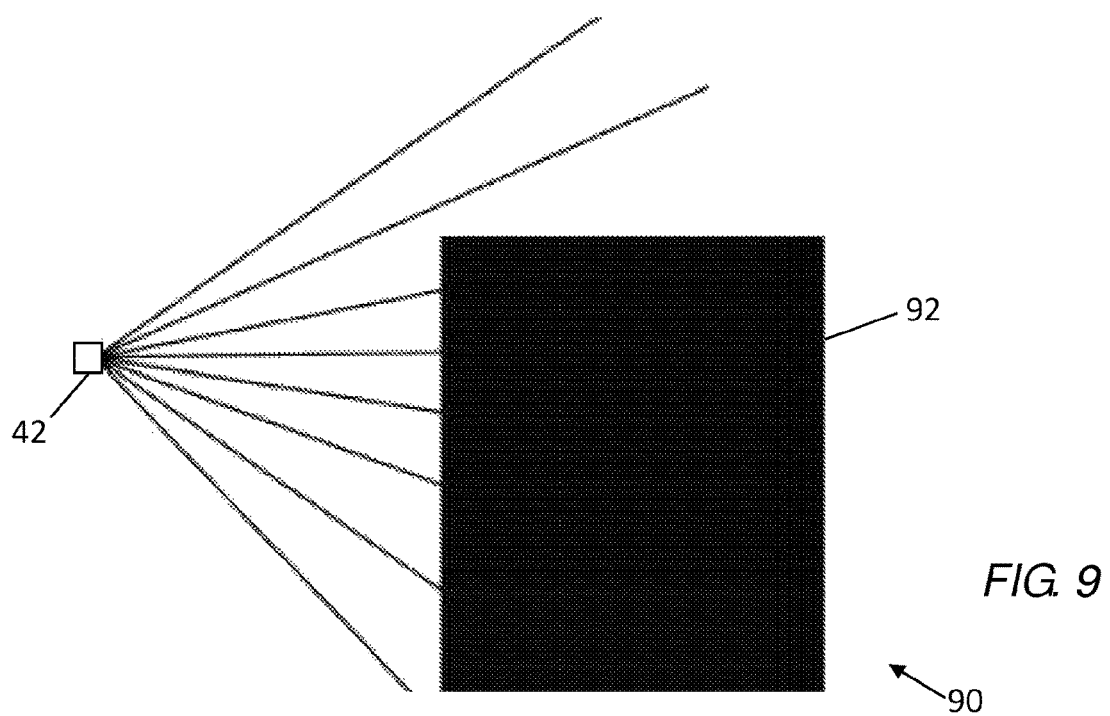
FIG. 9 is a block diagram of a system in accordance with an example embodiment.

FIG. 9 shows a system, indicated generally by the reference numeral 90, in accordance with an example embodiment. The system 90 includes the distance sensor 42 of the system 40 described above and further comprises an obstacle 92.

As described, in operation 73 of the algorithm 70, the distance sensor 42 seeks to determine whether an obstacle (such as the obstacle 92) is within the segment of interest identified in the operation 72.

The segment of interest may be determined from the motion vector of the drone or unmanned aerial vehicle with which the distance sensor 42 is associated. For example, based on the current location of the drone or unmanned aerial vehicle (determined from telemetry data) and the intended destination of the drone or unmanned aerial vehicle, a velocity vector along x, y and z axes of motion can be determined.

As indicated in FIG. 9, the distance sensor 42 receives different measurements from each of a plurality of different directions within the field-of-view of the distance 42. By way of example, the distance sensor 42 may be a 48-degree FoV LIDAR having 8 segments, such that each of the 8 segments receives data over 6 degrees of the distance sensor view.

By correlating the velocity or motion vector of the drone or unmanned aerial vehicle with the segments of data available to the distance sensor 42, the segment of interest can be determined. In this way, the relevant segments of the sensor 42 (e.g. the relevant ones of the 6 degree FoV segments of the system 90) can be selected for use with the algorithm 70. Thus, the sensor segment(s) which have the same angle (i.e. direction) as the velocity or motion vector of the drone or unmanned aerial vehicle can be selected. The resources of the drone or unmanned aerial vehicle are then be used for computing relevant data.

It should be noted that, as discussed with reference to FIG. 8, the pitch of the drone or unmanned aerial vehicle may be relevant to the selection of the segment(s) of the distance sensor 42 to be used in the algorithm 70.

Figure 10:
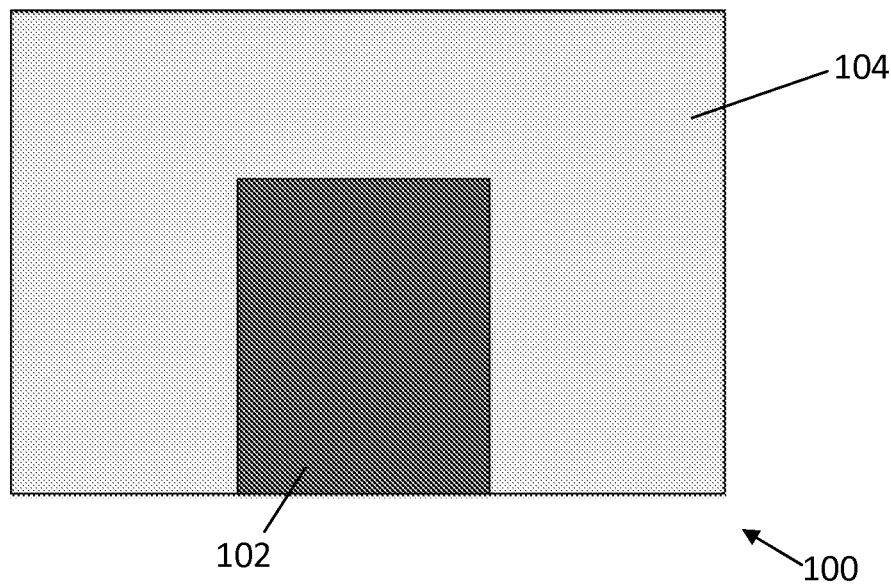
FIG. 10 shows an output in accordance with an example embodiment.

FIG. 10 shows an output, indicated generally by the reference numeral 100, in accordance with an example embodiment. The output 100 is generated from the image captured by an image capturing device (such as the imaging device 44) modified to indicate distance information (for example captured using the distance sensor 42). Thus, the output 100 may be generated by combing two-dimensional data obtained from image data and distance data obtained from a distance sensor.

The output includes a first portion 102 indicating the presence of an obstacle and a second portion 104 indicating the absence of an obstacle. The second portion 104 may be provided as a background (e.g. as a background colour), with the first portion 102 being provided in a different colour. The exact pixel locations of the first portion 102 can be used to determine obstacles in the operation 73 of the algorithm 70.

The output 100 may be generated by a neural network (e.g. a convolutional neural network). As will be apparent to those skilled in the art, other computer vision techniques could be used in the generation of the output 100 from the image captured by the imaging device 44.

As noted above, the image segmentation may be triggered when an obstacle is detected. Since the image segmentation may be computationally intensive, such an arrangement is computationally efficient. It is also reason to avoid using resources unnecessary. By providing a computationally efficient algorithm it is possible, in some embodiments, to implement the algorithm 70 as part of a general processing unit (GPU) of a drone or unmanned aerial vehicle.

As discussed above, the operation 36 is used to determine the dimensions of an identified obstacle. One method for implementing the operation 36 is described below. Of course, alternative methods are possible.

The following data may be available:
- the location of the drone or unmanned aerial vehicle 12 (e.g. from telemetry data);
- the horizontal distance from an identified obstacle (e.g. as provide by the distance sensor 42);
- the position of the obstacle in an image captured by the imaging device 44 (e.g. as determined from the image segmentation of operation 76);
- the field of view of the imaging device 44.

The approximate location of the obstacle can be provided as follows:

Location of obstacle = (location of drone or unmanned aerial vehicle) +

(horizonal distance to the obstacle rotated by the heading of the drone or unmanned drone or aerial vehicle)

The height of the obstacle can be estimated as follows:

Vertical angle covered by image =

$\frac{\text{Height of the obstacle in pixels}}{\text{Total height of image in pixels}} \times (\text{Vertical } FoV \text{ of the imaging device})$ Height of image = tan(Vertical angle covered by image) ×

(horizontal distance to the obstacle))

The width of the obstacle can estimated as follows:

Horizontal angle covered by image = $\frac{\text{Width of the obstacle in pixels}}{\text{Total width of image in pixels}} \times$ (Horizontal $FoV$ of the imaging device)

Width of image = tan (Horizontal angle covered by image) ×

(horizontal distance to the obstacle))

The calculation is an approximation as the image is a 2D projection of 3D objects. Thus, we can verify whether reconstruction of 3D object from 2D projection is correct or not by using the earlier discarded LIDAR data. The LIDAR data which were not on the motion path of the drone can be used to verify the dimensionality correctness of the obstacles.

With the obstacle dimensions (i.e. height and width) and the distance to the obstacle determined, one or more evasive paths can be determined in the operation 38 of the algorithm 30.

In one embodiment, the evasive path determination operation 38 seeks to change the altitude of the drone or unmanned aerial vehicle such that the drone or unmanned aerial vehicle is controlled to fly over the obstacle. In such embodiments, the horizontal position of the drone or unmanned aerial vehicle may be controlled to fly around the obstacle in the event that the obstacle is too tall to fly over (e.g. if the height of the drone or unmanned aerial vehicle on such an evasive path would exceed a maximum height allowed for the drone or unmanned aerial vehicle). Clearly, such biasing in favour of adjusting a vertical path over adjusting a horizontal path represents one example implementation; other implementations are possible. In some embodiments, the maximum height for the drone or unmanned aerial vehicle may be set at the legal limit in the relevant jurisdiction (e.g. 150 metres in Finland).

It may be possible, in some embodiments, to verify the estimated location and dimensions of the obstacle on the basis of the distance data. As discussed above, some distance sensor data may be discarded (as not being the same direction as the motion or velocity vector of the drone or unmanned aerial vehicle). It may be possible to use these readings to verify the accuracy of the estimate of the obstacle position and dimensions.

Sometimes, the obstacle position and dimension estimates may be inaccurate. This may be mitigated by a continuous process of data sensing and processing. In this scenario, a path of a drone or unmanned aerial vehicle may be continuously updated until an obstacle is out-of-range.

The example discussed above have generally assumed that a drone or unmanned aerial vehicle travels from a current location to a destination along a path. Of course, the path does not necessarily need to be a straight line.

Figure 11:
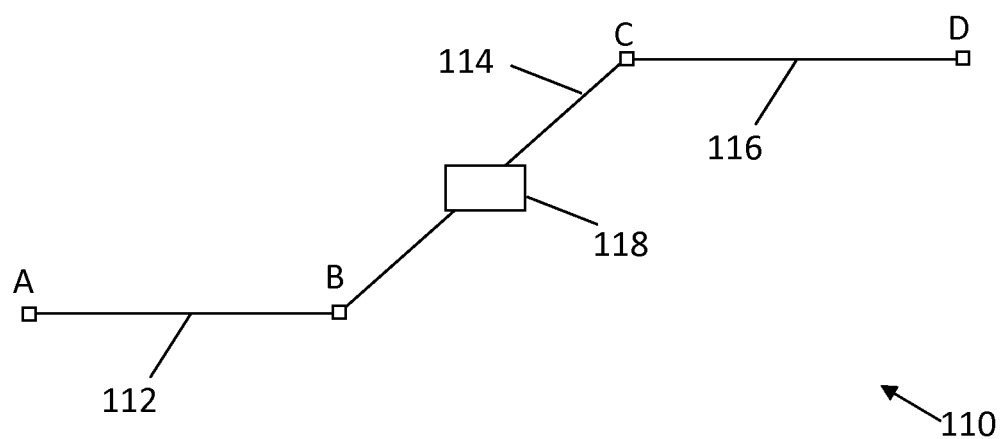
FIG. 11 is a block diagram of a system in accordance with an example embodiment.

By way of example, FIG. 11 shows a system indicated generally by the reference numeral 110, in accordance with an example embodiment. The system 110 shows a path comprising a first segment 112, a second segment 114 and a third segment 116. The path is an intended path for a drone or unmanned aerial vehicle (UAV), such that the UAV is intended to travel from location A to location B (along the path 112), from location B to location C (along the path 114) and from location C to location D (along the path 116). As shown in FIG. 11, an obstacle 118 is on the path 114 (between the locations B and C).

Assume that the UAV is at the location A. The field of view of the UAV is directed towards the location B along the path 112. Assume that due to the narrow field-of-view of the UAV, the obstacle is not within that field-of-view. Accordingly, the UAV proceeds to the location B.

At the location B, the intended motion direction of the UAV changes such that the field-of-view of the UAV is directed towards the location C along the path 114. In one embodiment, the field of view of distance sensor of the UAV is changed before UAV starts to move along the path 114 such that the obstacle may be detected before the UAV starts to move along the path 114. Moreover, in one embodiment, the field of view of the distance sensor of the UAV may be changed between a current and a new movement direction or pitch (and possibly back again) before reaching the location B such that the obstacle may be detected before the UAV even reaches the location B, when the obstacle is close enough (so that sensor is able to detect objects) to the location B, for example. One or more threshold values (such as a distance to a change of path location and/or a change in angle at a forthcoming intended/planned change of path location) may be provided to determine when to change a field of view of the distance sensor ahead of a change of path location. Furthermore, the contour dimensions of UAV may project over the new planned motion vector from field of view of distance sensor to change the segment to be analysed.

The angles shown in FIG. 11 are provided by way of example and many alternatives are possible. For example, the angle at a change in direction (e.g. the location B) may be close to 180 degrees (e.g. 160 degrees) such that the UAV almost changes direction. In such an example, when travelling along the path 112, the UAV may have detected an obstacle on the path 114, but discarded the relevant data as not being on the path 112. However, UAV may consider such data when approaching or departing from the location B and take reasonable steps to avoid that obstacle, thereby preparing an evasive path at an early stage. This may increase the effectiveness of evasive path determination.

In one embodiment the path planning, an example of path shown may in FIG. 11, be done in ground control station which can send the planned path to the UAV, for example.

Figure 12:
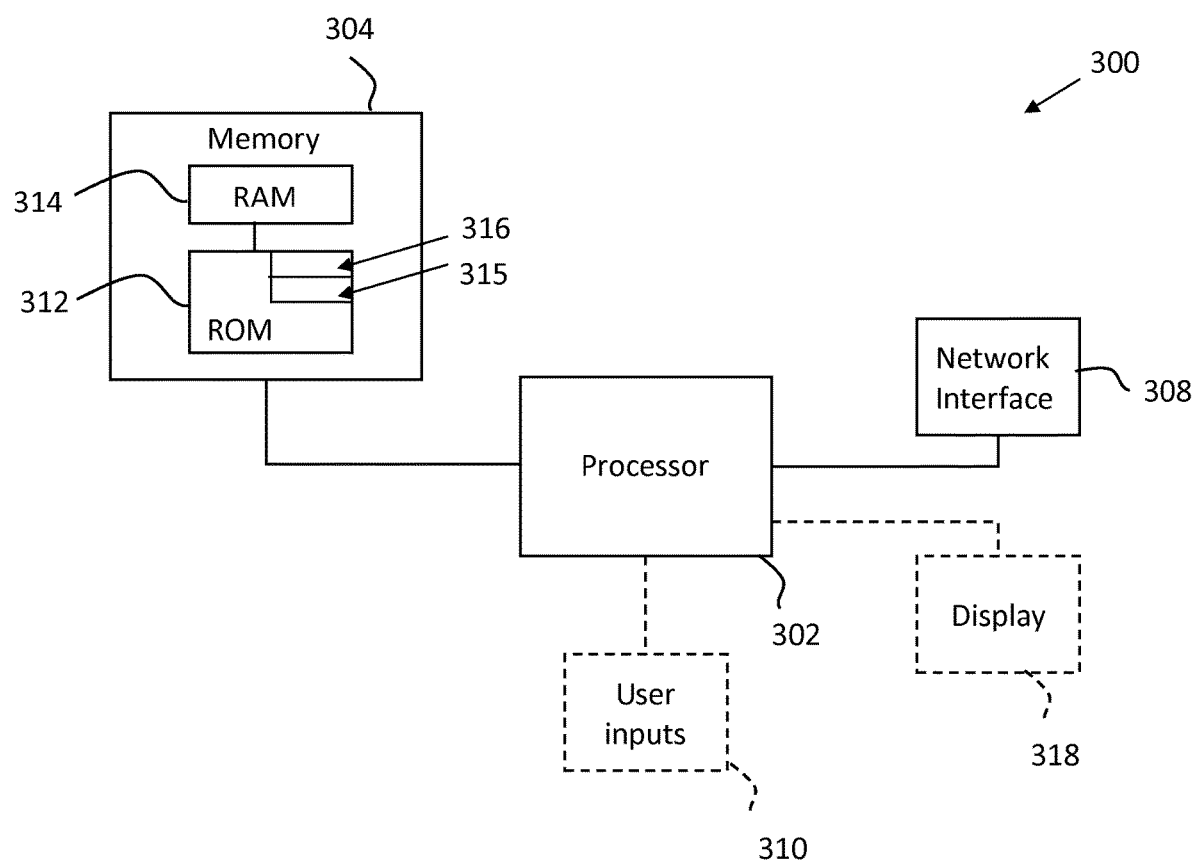
FIG. 12 is a block diagram of a system in accordance with an example embodiment.

For completeness, FIG. 12 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible. User input 310 and display 318 may be connected to a remote processor like ground control station. Remote connection may be LTE or 5G type fast connection between remote processor and processor.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30 and 70 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 13A:
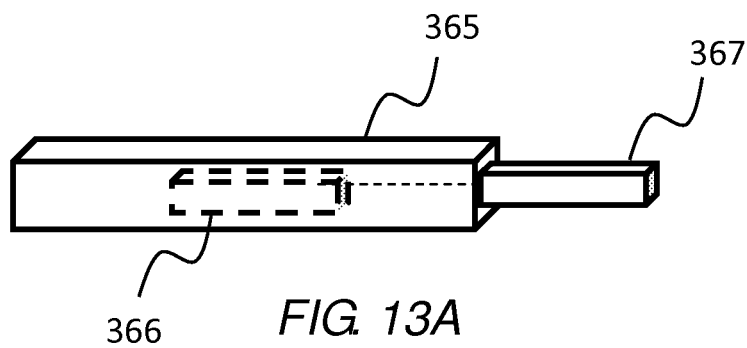
FIGS. 13A and 13B show tangible media, respectively a removable memory unit and a compact disc (CD) storing computer-readable code which when run by a computer perform operations according to example embodiments.
Figure 13B:
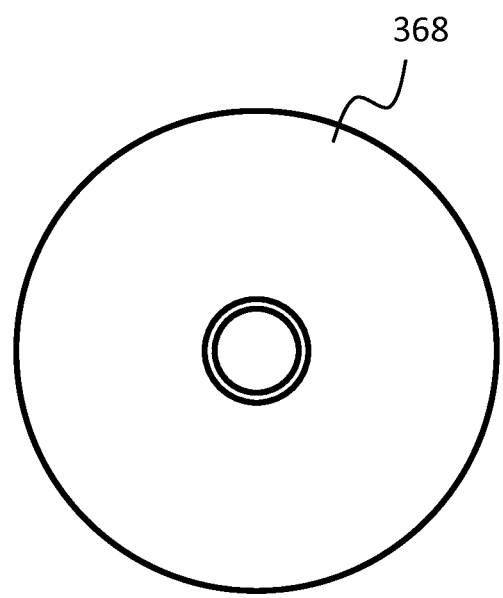

FIGS. 13A and 13B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3 and 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. For example, it would be possible to extend the principles described herein to other applications, such as the control of robots or similar objects.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code which, when executed by the at least one processor, causes the apparatus to:
   receive at least one of telemetry data or motion vector data for a drone or unmanned aerial vehicle;
   receive distance data from a distance sensor of the drone or unmanned aerial vehicle;
   determine a segment of interest dependent on at least one of said telemetry data or motion vector data;
   process said distance data to determine whether one or more obstacles fall within said segment of interest;
   receive imaging data; and
   provide imaging data analysis in the event that the one or more obstacles are determined to fall within said segment of interest, wherein the imaging data analysis is performed on a number of images dependent on a flight maneuver of the drone or the unmanned aerial vehicle.

2. An apparatus as claimed in claim 1, wherein the apparatus is further caused to:
   segment said imaging data in the event that an obstacle is determined to fall within said segment of interest; and
   estimate dimensions of said obstacle from said segmented image data and said distance data.

3. An apparatus as claimed in claim 2, the apparatus is further caused to:
   determine one or more evasive paths, in the event that an obstacle is determined to fall within said segment of interest, wherein the one or more evasive paths are determined, at least in part, based on said estimated dimensions of said obstacle and said distance data.

4. An apparatus as claimed in claim 3, wherein the apparatus further caused to segment said imaging data comprises a neural network.

5. An apparatus as claimed in claim 4, the apparatus is further caused to:
   verify said dimensions of said obstacle using, at least in part, distance data outside said segment of interest.

6. An apparatus as claimed in claim 5, wherein distance data outside of said segment of interest is discarded.

7. An apparatus as claimed in claim 6, wherein the apparatus is further caused to verify whether reconstruction of a 3D object from a 2D projection is correct or not by using discarded distance data.

8. An apparatus as claimed in claim 4, wherein said distance sensor comprises a LIDAR sensor and has a limited field of view.

9. An apparatus as claimed in claim 1, wherein the telemetry data is used to define a pitch of the drone or unmanned aerial vehicle.

10. An apparatus as claimed in claim 9, wherein the telemetry data is obtained from at least one of a GPS unit, gyroscope, compass or barometer of the drone or unmanned aerial vehicle.

11. An apparatus as claimed in claim 9, wherein the apparatus is further caused to select the segment of interest based on the pitch of the drone or unmanned aerial vehicle.

12. An apparatus as claimed in claim 1, wherein the motion vector data defines at least one of a direction of travel or a planned route of the drone or unmanned aerial vehicle.

13. An apparatus as claimed in claim 1, wherein the apparatus is further caused to, responsive to a path of the drone or unmanned aerial vehicle changing, change a field of view of distance sensor before the drone or unmanned aerial vehicle starts to move along a changed path.

14. An apparatus as claimed in claim 13, wherein the apparatus is further caused to project contour dimensions of the drone or unmanned aerial vehicle over a new planned motion vector from the field of view of distance sensor to change said segment of interest of the changed path to be analyzed.

15. An apparatus as claimed in claim 1, wherein the flight maneuver comprises a height at which the drone or the unmanned aerial vehicle is flying or the distance between the one or more obstacles and the drone or the unmanned aerial vehicle.

16. An apparatus as claimed in claim 15, wherein the number of images dependent on the flight maneuver is fewer if the height at which the drone or the unmanned aerial vehicle is flying is lower than a maximum height allowed.

17. A method comprising:
receiving at least one of telemetry data or motion vector data for a drone or unmanned aerial vehicle;
receiving distance data from a distance sensor of the drone or unmanned aerial vehicle;
determining a segment of interest dependent on at least one of said telemetry data or motion vector data;
processing said distance data to determine whether one or more obstacles fall within said segment of interest;
receiving imaging data; and
providing imaging data analysis in the event that the one or more obstacles are determined to fall within said segment of interest, wherein the imaging data analysis is performed on a number of images dependent on a flight maneuver of the drone or the unmanned aerial vehicle.

18. A method as claimed in claim 17, wherein said distance data is processed until an event that an obstacle is not determined to fall within said segment of interest.

19. A method as claimed in claim 17, wherein the providing of imaging data analysis further comprises:
segmenting said imaging data in an event that an obstacle is determined to fall within said segment of interest; and
estimating dimensions of said obstacle from said segmented image data and said distance data.

20. A computer program product comprising at least one non-transitory computer-readable storage medium having computer-executable program code instructions stored therein, the computer-executable program code instructions comprising program code instructions to:
receive at least one of telemetry data or motion vector data for a drone or unmanned aerial vehicle;
receive distance data from a distance sensor of the drone or unmanned aerial vehicle;
determine a segment of interest dependent on at least one of said telemetry data or motion vector data;
process said distance data to determine whether one or more obstacles fall within said segment of interest;
receive imaging data; and
provide imaging data analysis in the event that the one or more obstacles are determined to fall within said segment of interest, wherein the imaging data analysis is performed on a number of images dependent on a flight maneuver of the drone or the unmanned aerial vehicle.

* * * * *